(12) United States Patent
Lussier et al.

(10) Patent No.: US 11,958,549 B2
(45) Date of Patent: Apr. 16, 2024

(54) STANDARD COMPONENT OF A VEHICLE WITH A CONNECTOR DEDICATED TO CONNECTING A TRACK SYSTEM TO THE VEHICLE

(71) Applicant: CAMSO INC., Magog (CA)

(72) Inventors: Alain Lussier, St-Francois Xavier de Brompton (CA); Frederic Couture, Sherbrooke (CA); Etienne Poulin, Sherbrooke (CA)

(73) Assignee: Camso Inc., Magog (CA)

( * ) Notice: Subject to any disclaimer, the term of this patent is extended or adjusted under 35 U.S.C. 154(b) by 387 days.

(21) Appl. No.: 16/632,525

(22) PCT Filed: Jul. 16, 2018

(86) PCT No.: PCT/CA2018/050861
§ 371 (c)(1),
(2) Date: Jan. 20, 2020

(87) PCT Pub. No.: WO2019/014757
PCT Pub. Date: Jan. 24, 2019

(65) Prior Publication Data
US 2020/0189671 A1    Jun. 18, 2020

Related U.S. Application Data

(60) Provisional application No. 62/534,946, filed on Jul. 20, 2017.

(51) Int. Cl.
*B62D 55/04* (2006.01)
*B60B 35/12* (2006.01)
(Continued)

(52) U.S. Cl.
CPC .............. *B62D 55/04* (2013.01); *B60B 35/12* (2013.01); *B60B 35/16* (2013.01); *B62D 21/186* (2013.01);
(Continued)

(58) Field of Classification Search
CPC .... B62D 55/04; B62D 55/065; B62D 55/084; B62D 21/186; B62D 27/02; B62D 55/14; B60B 35/12; B60B 35/16
See application file for complete search history.

(56) References Cited

U.S. PATENT DOCUMENTS 2,057,211 A    10/1936    Shere
3,682,266 A    8/1972    Stoliker
(Continued)

FOREIGN PATENT DOCUMENTS

EP        1566326 A1 *    8/2005    ........... B62D 21/186
WO    WO2019014757 A1    1/2019

OTHER PUBLICATIONS

International Search Report dated Sep. 21, 2018 in connection with PCT Application No. PCT/CA2018/050861, 3 pages.

*Primary Examiner* — Kevin Hurley
*Assistant Examiner* — Abigail R Hymel
(74) *Attorney, Agent, or Firm* — Hahn Loeser & Parks, LLP; Bret A. Hrivnak

(57) ABSTRACT

A standard component of a vehicle equippable with a plurality of wheels or a plurality of track systems for engaging the ground, such as an axle housing or a frame of the vehicle, comprises a connector dedicated to connecting a given one of the track systems to the vehicle and provided during original manufacturing of the standard component of the vehicle. This may facilitate installation of the track systems on the vehicle.

54 Claims, 17 Drawing Sheets

(51) Int. Cl.
  *B60B 35/16* (2006.01)
  *B62D 21/18* (2006.01)
  *B62D 27/02* (2006.01)
  *B62D 55/065* (2006.01)
  *B62D 55/084* (2006.01)
  *E02F 9/02* (2006.01)
  *E02F 9/08* (2006.01)

(52) U.S. Cl.
  CPC .......... *B62D 27/02* (2013.01); *B62D 55/065* (2013.01); *B62D 55/084* (2013.01); *E02F 9/02* (2013.01); *E02F 9/0808* (2013.01); *B62D 55/0655* (2013.01)

(56) References Cited

U.S. PATENT DOCUMENTS

| | | | |
|---|---|---|---|
| 6,199,646 B1 | 3/2001 | Tani et al. | |
| 6,374,933 B1* | 4/2002 | Ruppert, Jr. | B62D 21/14 |
| | | | 180/9.44 |
| 9,688,322 B1* | 6/2017 | Prickel | B62D 55/084 |
| 2006/0181148 A1* | 8/2006 | Bessette | B62D 55/04 |
| | | | 305/124 |
| 2009/0065270 A1* | 3/2009 | Bordini | B62D 55/305 |
| | | | 180/9.1 |
| 2009/0308669 A1* | 12/2009 | Vos | E02F 9/0833 |
| | | | 180/9.23 |
| 2010/0139994 A1* | 6/2010 | Hansen | B62D 55/14 |
| | | | 180/9.26 |
| 2011/0101135 A1* | 5/2011 | Korus | B62D 55/04 |
| | | | 239/723 |
| 2011/0127759 A1* | 6/2011 | Carr | B62D 21/02 |
| | | | 280/781 |
| 2013/0043085 A1* | 2/2013 | Hansen | B62D 55/104 |
| | | | 180/9.21 |
| 2013/0187444 A1* | 7/2013 | Hansen | B62D 55/084 |
| | | | 305/142 |
| 2013/0277928 A1* | 10/2013 | Pare | B62D 55/06 |
| | | | 280/28.5 |
| 2014/0069730 A1* | 3/2014 | Lafreniere | B62D 55/084 |
| | | | 180/9.21 |
| 2015/0048671 A1* | 2/2015 | Hansen | B62D 55/04 |
| | | | 305/165 |
| 2015/0197279 A1 | 7/2015 | Paréet al. | |
| 2016/0159414 A1* | 6/2016 | Hansen | B62D 55/084 |
| | | | 305/185 |
| 2016/0201292 A1* | 7/2016 | Ducheneaux | E02F 9/02 |
| | | | 296/193.01 |
| 2016/0221617 A1* | 8/2016 | Erickson | B62D 49/00 |
| 2016/0355054 A1* | 12/2016 | Jensen | B60B 35/14 |
| 2017/0113742 A1* | 4/2017 | Tratta | B62D 55/08 |
| 2020/0189671 A1 | 6/2020 | Lussier et al. | |

* cited by examiner

STANDARD COMPONENT OF A VEHICLE WITH A CONNECTOR DEDICATED TO CONNECTING A TRACK SYSTEM TO THE VEHICLE

CROSS-REFERENCE TO RELATED APPLICATION

This application claims priority from U.S. Provisional Patent Application 62/534,946 filed on Jul. 20, 2017 and incorporated by reference herein.

FIELD

This disclosure relates generally to vehicles and, more particularly, to vehicles comprising track systems for traction.

BACKGROUND

Certain vehicles, including industrial vehicles such as construction vehicles (e.g., excavators, bulldozers, loaders, etc.), agricultural vehicles (e.g., harvesters, combines, tractors, etc.), and forestry vehicles (e.g., feller-bunchers, tree chippers, knuckleboom loaders, etc.), military vehicles (e.g., combat engineering vehicles (CEVs), etc.), snowmobiles, and all-terrain vehicles (ATVs), for example, may be equipped with track systems to enhance their traction and floatation on soft, slippery and/or irregular grounds (e.g., soil, mud, sand, ice, snow, etc.) on which they operate.

Installing track systems on a vehicle can sometimes be complex and/or time-consuming. In some cases, the track systems may be mounted to the vehicle to replace ground-engaging wheels of the vehicle (e.g., depending on an application, a terrain, and/or other factors). In other cases, the track systems may be mounted to the vehicle during original manufacturing of the vehicle.

For these and other reasons, there is a need to improve vehicles, including to facilitate installation of tracks systems on vehicles.

SUMMARY

According to an aspect of this disclosure, there is provided a vehicle equippable with a plurality of wheels or a plurality of track systems for engaging the ground. A standard component of the vehicle comprises a connector dedicated to connecting a given one of the track systems to the vehicle and provided during original manufacturing of the standard component of the vehicle.

According to another aspect of this disclosure, there is provided a standard component of a vehicle. The vehicle is equippable with a plurality of wheels or a plurality of track systems for engaging the ground. The standard component of the vehicle comprises a connector dedicated to connecting a given one of the track systems to the vehicle and provided during original manufacturing of the standard component of the vehicle.

According to another aspect of this disclosure, there is provided an axle housing for housing an axle of a vehicle. The vehicle is equippable with a plurality of track systems for engaging the ground. The axle housing comprises a connector dedicated to connecting a given one of the track systems to the vehicle and provided during original manufacturing of the axle housing.

According to another aspect of this disclosure, there is provided a frame for a vehicle. The vehicle is equippable with a plurality of wheels or a plurality of track systems for engaging the ground. The frame comprises a connector dedicated to connecting a given one of the track systems to the vehicle and provided during original manufacturing of the frame.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for the purpose of illustrating certain embodiments and are an aid for understanding. They are not intended to be and should not be limitative.

DETAILED DESCRIPTION OF EMBODIMENTS

Figure 1:
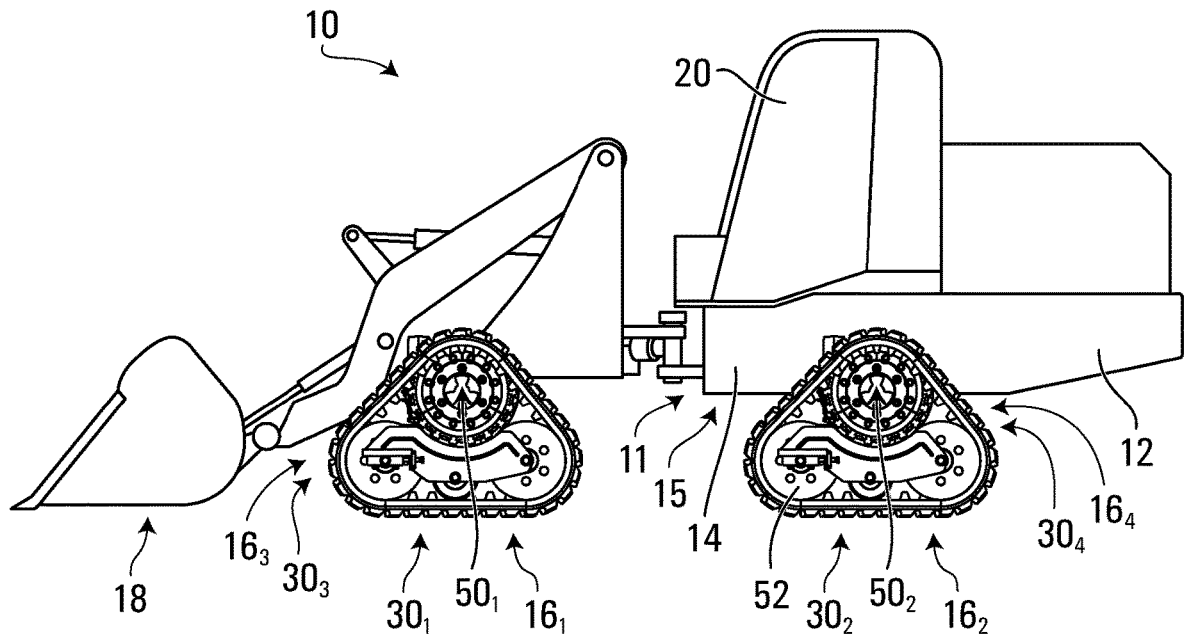
FIG. 1 shows an example of a vehicle comprising track systems in accordance with an embodiment.

FIG. 1 shows an example of a vehicle 10 in accordance with an embodiment. In this embodiment, the vehicle 10 is a heavy-duty work vehicle for performing construction, agricultural, or other industrial work or military work. More particularly, in this embodiment, the vehicle 10 is a construction vehicle for performing construction work. Specifically, in this example, the construction vehicle 10 is a front loader. In other examples, the construction vehicle 10 may be a backhoe loader, a bulldozer, a skid steer loader, or any other type of construction vehicle.

The construction vehicle 10 comprises a chassis 11 connected to a plurality of ground-engaging traction components $30_1$-$30_4$ which enable an operator to move the construction vehicle 10 on the ground to perform construction work using a work implement 18.

Figure 2:
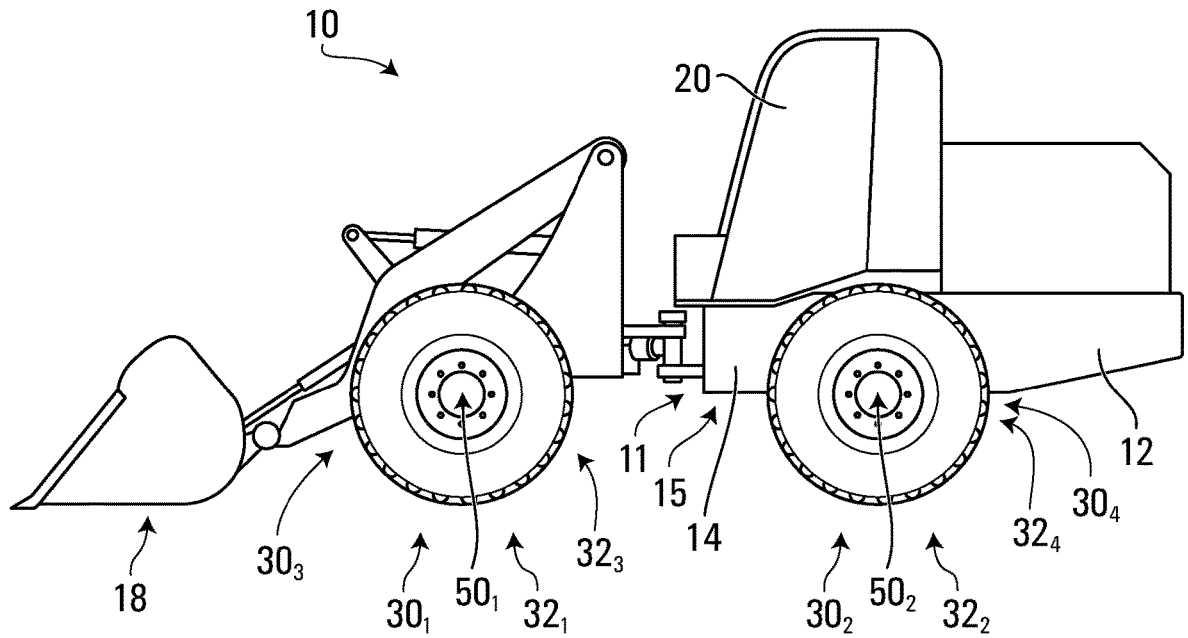
FIG. 2 shows an example in which the vehicle is equipped with ground-engaging wheels in place of the track systems.
Figure 3:
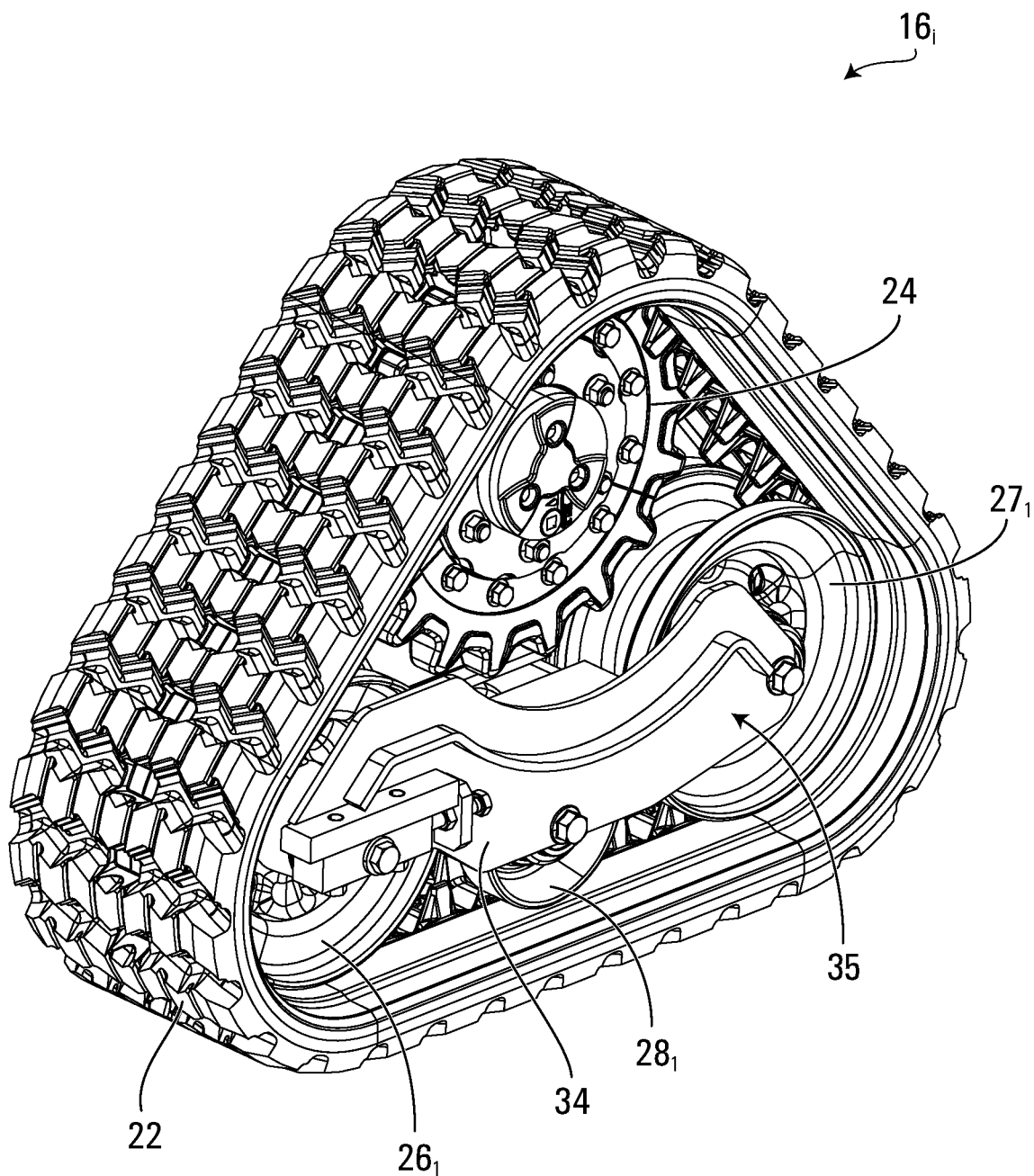
FIGS. 3 and 4 are front and rear perspective views of an embodiment of a track system of the vehicle.

In this embodiment, the ground-engaging traction components $30_1$-$30_4$ with which the construction vehicle 10 can be equipped may be a plurality of ground-engaging track systems $16_1$-$16_4$ as in FIG. 1 or a plurality of ground-engaging wheels $32_1$-$32_4$ as in FIG. 2. By being equippable (i.e., capable of being equipped) with either the wheels $32_1$-$32_4$ or the track systems $16_1$-$16_4$, the construction vehicle 10 is better able to adapt itself to an environment in which it is used. For example, the construction vehicle 10 may be equipped with the wheels $32_1$-$32_4$ in an environment (e.g., a trail, a relatively hard soil, etc.) where they provide adequate floatation and traction, whereas the construction vehicle 10 may be equipped with the track systems $16_1$-$16_4$ in an environment (e.g., soft soil, snow, ice, mud, sand, marsh, etc.) where the wheels $32_1$-$32_4$ would not provide adequate floatation and traction possibly resulting in the construction vehicle 10 bogging down or getting stuck. In other words, the construction vehicle 10 may be equipped with the track systems $16_1$-$16_4$ to enhance its floatation and traction compared to when it is equipped with the wheels $32_1$-$32_4$.

As will be further discussed later, in this embodiment, the construction vehicle 10 is configured to facilitate installation of the track systems $16_1$-$16_4$ thereon. Part of a standard component of the vehicle 10 (e.g., part of the chassis 11) may be dedicated to connecting each of the track systems $16_1$-$16_4$ to the vehicle 10. This may simplify connection of the track systems $16_1$-$16_4$ to the vehicle 10 and thus reduce time and effort required for connecting the track systems $16_1$-$16_4$ to the vehicle 10.

The chassis 11 comprises a frame 12 of the construction vehicle 10. In this embodiment, the chassis 11 also comprises at least part of a powertrain 15 of the construction vehicle 10.

The powertrain 15 is configured for generating motive power for the vehicle 10, including to cause the ground-engaging traction components $30_1$-$30_4$ to propel the vehicle 10 on the ground. To that end, the powertrain 15 comprises a prime mover 14, which is a source of motive power that comprises one or more motors (e.g., an internal combustion engine, an electric motor, etc.). For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor).

In this embodiment, the prime mover 14 is in a driving relationship with the ground-engaging traction components $30_1$-$30_4$. That is, the powertrain 15 transmits motive power from the prime mover 14 to the ground-engaging traction components $30_1$-$30_4$ in order to drive (i.e., impart motion to) the ground-engaging traction components $30_1$-$30_4$. To that end, in this embodiment, the powertrain 15 comprises front and rear axle assemblies $50_1$, $50_2$ for driving front and rear ones of the ground-engaging traction components $30_1$-$30_4$. Each axle assembly $50_i$ comprises an axle 52 that is driven by power generated by the prime mover 14 to drive a given one of the ground-engaging traction components $30_1$-$30_4$. Also, in this embodiment, the axle assembly $50_i$ comprises an axle housing 54 that houses the axle 52 such as to cover at least part of the axle 52.

In this example, the construction vehicle 10 comprises an operator cabin 20 for the operator. The operator cabin 20 is where the operator sits and controls the construction vehicle 10. More particularly, the operator cabin 20 comprises a user interface including a set of controls that allow the operator to steer the construction vehicle 10 on the ground, operate the work implement 18, and control other aspects of the vehicle 10.

The work implement 18 is used to perform construction work. For example, in some embodiments, the work implement 18 may comprise a bucket mounted to a hinged boom for moving soil, debris or other material. In other embodiments, the work implement 18 may be a dozer blade, a backhoe, a fork, a grapple, a scraper pan, an auger, a saw, a ripper, a material-handling arm, or any other type of construction work implement.

Each track system $16_i$ engages the ground to provide traction to the construction vehicle 10. With additional reference to FIGS. 3 to 6, in this embodiment, the track system $16_i$ comprises a track-engaging assembly 21 and a track 22 disposed around the track-engaging assembly 21. The track-engaging assembly 21 comprises a plurality of wheels, including a drive wheel 24 and a plurality of idler wheels, which includes front (i.e., leading) idler wheels $26_1$, $26_2$, rear (i.e., trailing) idler wheels $27_1$, $27_2$ and roller wheels $28_1$, $28_2$. The track system $16_i$ also comprises a frame 34 which supports various components of the track system $16_i$ including the idler wheels $26_1$, $26_2$, $27_1$, $27_2$, $28_1$, $28_2$. The track system $16_i$ has a longitudinal direction and a first longitudinal end 57 and a second longitudinal end 59 that define a length of the track system $16_i$. The track system $16_i$ has a widthwise direction and a width that is defined by a width of the track 22. The track system $16_i$ also has a height direction that is normal to its longitudinal direction and its widthwise direction.

The drive wheel 24 is rotatable using power generated by the prime mover 14 and delivered over the powertrain 15 to impart motion of the track 22. In this embodiment, the drive wheel 24 is a drive sprocket and the track 22 comprises a plurality of drive voids $31_1$-$31_D$ (i.e., hollow spaces) which receive drive members (e.g., teeth) of the drive wheel 24 in order to drive the track 22. In some cases, the drive voids $31_1$-$31_D$ may be recesses. In other cases, the drive voids $31_1$-$31_D$ may be openings which traverse a thickness of the track 22.

The idler wheels $26_1$, $26_2$, $27_1$, $27_2$, $28_1$, $28_2$ are not driven by power supplied by the prime mover 14, but are rather used to do at least one of supporting part of a weight of the vehicle 10 on the ground via the track 22, guiding the track 22 as it is driven by the drive wheel 24, and tensioning the track 22. More particularly, in this embodiment, the front and rear idler wheels $26_1$, $26_2$, $27_1$, $27_2$ maintain the track 22 in tension and may help to support part of the weight of the vehicle 10 on the ground via the track 22. The roller wheels $28_1$, $28_2$ roll on the track to apply the track 22 onto the ground. In this case, as they are located between frontmost and rearmost ones of the wheels of the track system $16_i$, the roller wheels $28_1$, $28_2$ can be referred to as "mid-rollers".

The track 22 engages the ground to provide traction to the construction vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 7 to 10, the track 22 comprises an inner side 45, a ground-engaging outer side 47, and lateral edges $49_1$, $49_2$. The inner side 45 faces the track-engaging assembly 21, while the ground-engaging outer side 47 engages the ground. A top run 65 of the track 22 extends between the longitudinal ends 57, 59 of the track system $16_i$ and over the wheels 24, $26_1$, $26_2$, $27_1$, $27_2$, $28_1$, $28_2$. A bottom run 66 of the track 22 extends between the longitudinal ends 57, 59 of the track system $16_i$ and under the wheels 24, $26_1$, $26_2$, $27_1$, $27_2$, $28_1$, $28_2$. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thicknesswise direction normal to its longitudinal and widthwise directions.

In this embodiment, the track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, in this embodiment, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, a plurality of cores $44_1$-$44_N$ are at least partially embedded in the elastomeric material 38. The cores $44_1$-$44_N$ are distributed along and extend transversally to the longitudinal direction of the track 22 to impart transverse rigidity to the track 22. The cores $44_1$-$44_N$ may also help to drive the track 22 by engagement with the drive wheel 24 and/or guide some of the wheels 24, $26_1$, $26_2$, $27_1$, $27_2$, $28_1$, $28_2$ as the track 22 is driven by the drive wheel 24.

Each core $44_i$ has a longitudinal axis extending transversally (in this case, perpendicularly) to the longitudinal axis 19 of the track 22. More particularly, in this embodiment, each core $44_i$ comprises a pair of wings $51_1$, $51_2$ (i.e., extensions) and a wheel guide 53.

The wings $51_1$, $51_2$ are elongated along the longitudinal axis of the core $44_i$ to impart transverse rigidity to the track 22. Each of the wings $51_1$, $51_2$ has a top surface oriented towards the inner side 45 of the track 22 and a bottom surface oriented towards the ground-engaging outer side 47 of the track 22. In this embodiment, each of the wings $51_1$, $51_2$ has a tapered shape whereby its top surface converges longitudinally outwardly towards its bottom surface. The wings $51_1$, $51_2$ may have various other shapes in other embodiments.

The wheel guide 53 is located between the pair of wings $51_1$, $51_2$ and serves to guide some of the wheels 24, $26_1$, $26_2$, $27_1$, $27_2$, $28_1$, $28_2$ as the track 22 is driven by the drive wheel 24. More particularly, in this embodiment, the wheel guide 53 comprises a pair of guide projections $57_1$, $57_2$ that project on the inner side 55 of the track 22. Each guide projection $57_i$ comprises a top end, a base, and a pair of wheel-facing sides opposite one another and extending from its base to its top end. The wheel guide 53 may be configured in various other ways in other embodiments (e.g., it may comprise only one guide projection or more than two (2) guide projections).

In this embodiment, the core $44_i$, including its wings $51_1$, $51_2$ and wheel guide 53, is made of metallic material. For instance, in some embodiments, the core $44_i$ may be made of steel formed into shape by casting. The core $44_i$ may have various other shapes, may comprise various other components, may be made of various other rigid materials (e.g., polymers, ceramics, composites, etc.), and/or may be made using various other processes (e.g., forging, welding, fastening, etc.) in other embodiments.

In this example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43, while the cores $44_1$-$44_N$ are disposed between them.

The inner side 45 of the track 22 comprises an inner surface 55 of the carcass 36 and a plurality of wheel-contacting projections $48_1$-$48_N$ that project from the inner surface 55 and are positioned to contact at least some of the wheels 24, $26_1$, $26_2$, $27_1$, $27_2$, $28_1$-$28_R$ to do at least one of driving (i.e., imparting motion to) the track 22 and guiding the track 22. Since each of them is used to do at least one of driving the track 22 and guiding the track 22, the wheel-contacting projections $48_1$-$48_N$ can be referred to as "drive/guide projections". In some examples of implementation, a drive/guide projection $48_i$ may interact with the drive wheel 24 to drive the track 22, in which case the drive/guide projection $48_i$ is a drive projection. In other examples of implementation, a drive/guide projection $48_i$ may interact with the front and rear idler wheels $26_1$, $26_2$, $27_1$, $27_2$ and/or the roller wheels $28_1$-$28_R$ to guide the track 22 to maintain proper track alignment and prevent de-tracking without being used to drive the track 22, in which case the drive/guide projection $48_i$ is a guide projection. In yet other examples of implementation, a drive/guide projection $48_i$, may both (i) interact with the drive wheel 24 to drive the track and (ii) interact with the idler wheels $26_1$, $26_2$, $27_1$, $27_2$ and/or the roller wheels $28_1$-$28_R$ to guide the track 22 to maintain proper track alignment and prevent de-tracking, in which case the drive/guide projection $48_i$ is both a drive projection and a guide projection.

In this embodiment, each drive/guide projection $48_i$ comprises elastomeric material 67 overlying a given one of the guide projections $57_1$, $57_2$ of the cores $44_1$-$44_N$. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide projection $48_i$.

The ground-engaging outer side 47 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the track 22 and engaging the ground to enhance traction. The traction projections $58_1$-$58_T$ may be referred to as "tread projections" or "traction lugs".

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 47 in various ways. For example, in this embodiment, the traction lugs $58_1$-$58_T$ are provided on the ground-engaging outer side 47 by being molded with the carcass 36.

The track 22 may be constructed in various other manners in other embodiments. For example, in some embodiments, the cores $44_1$-$44_N$ may be omitted from the track 22.

The track system $16_i$ may be configured in various other ways in other embodiments. For example, in various embodiments, the track system $16_i$ may comprises more or fewer wheels, have a different (e.g., elongated) shape, etc.

Figure 11A:
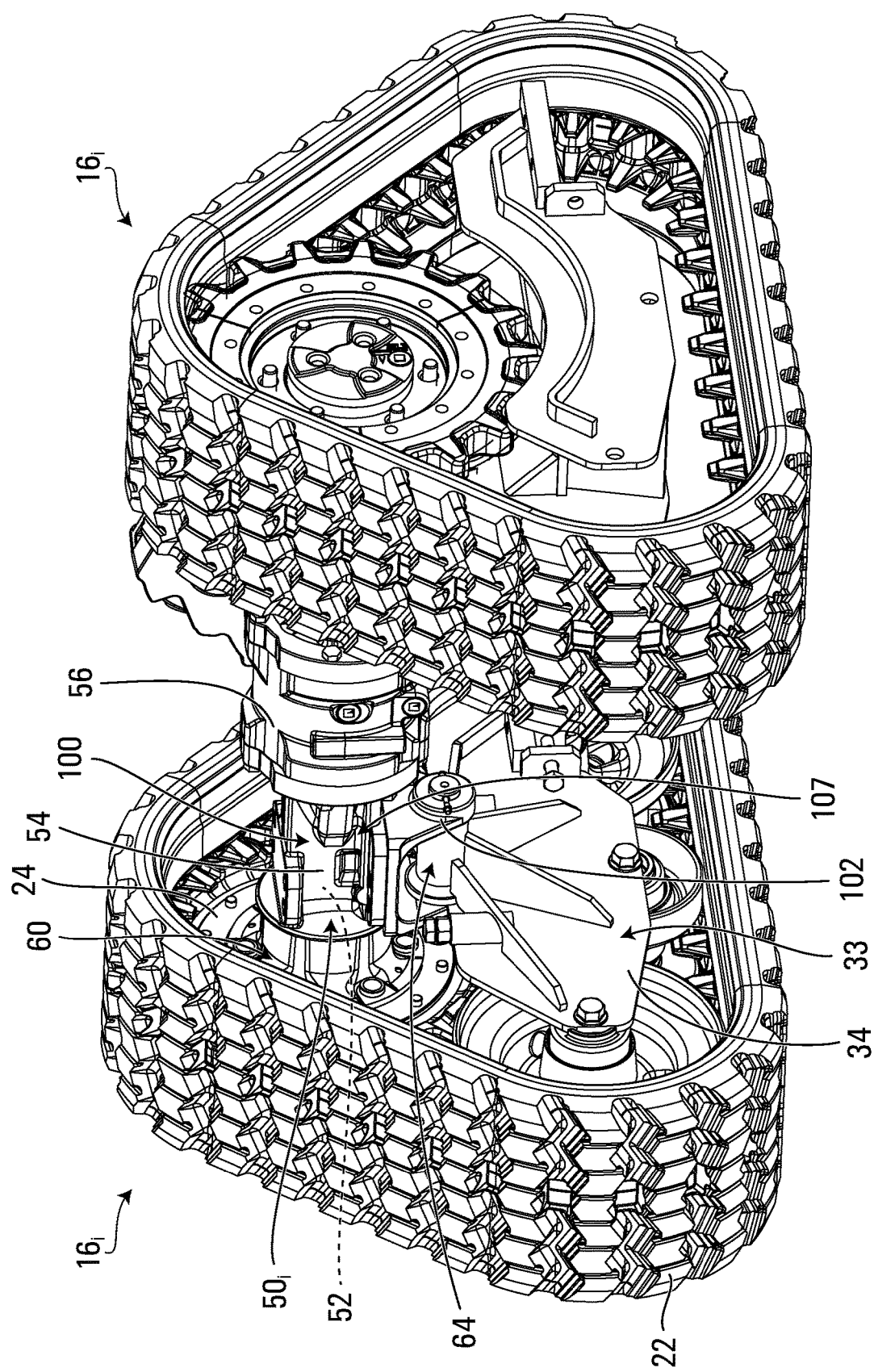
FIGS. 11A and 11B show an example of an embodiment in which an axle housing of the vehicle comprises a connector dedicated to connecting the track system to the vehicle.
Figure 11B:
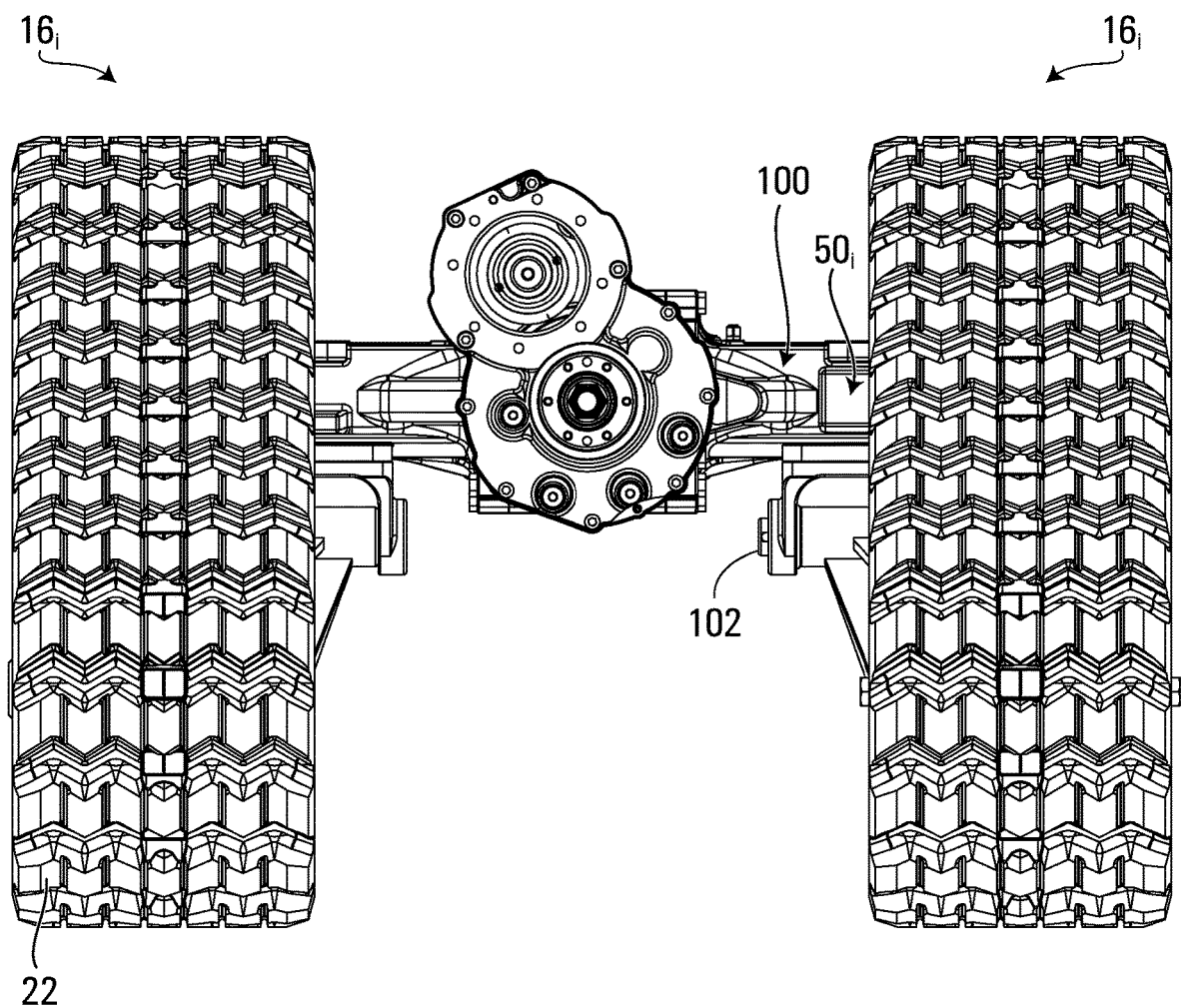

The construction vehicle 10 is configured to facilitate installation of the track systems $16_1$-$16_4$ on the vehicle 10. To that end, with additional reference to FIGS. 11A and 11B, in this embodiment, a standard component 100 of the vehicle 10 comprises a connector 102 dedicated to connecting each track system $16_i$ to the vehicle 10. The standard component 100 of the vehicle 10 is "standard" in that it is an ordinary and normal part of the vehicle 10, i.e., it is normally present in all vehicles like the vehicle 10. The track system $16_i$ can thus be installed more easily on the vehicle 10 by using the connector 102, which is provided as part of the standard component 100 of the vehicle 10.

The standard component 100 of the vehicle 10 may be any suitable part of the chassis 11, such as the frame 12 or a portion of the powertrain 15. In this embodiment, the standard component 100 of the vehicle 10 is nonrotatable for driving of the track 22 of the track system $16_i$ or a wheel $32_i$ that would be mounted in place of the track system $16_i$. That is, the standard component 100 of the vehicle 10 is not configured to rotate to drive the track 22 or the wheel $32_i$. In that sense, the standard component 100 of the vehicle 10 may be referred to as a standard nonrotating component of the vehicle 10. More particularly, in this embodiment, the standard component 100 of the vehicle 10 is fixed (i.e., immobile) relative to at least part of the frame 12 of the vehicle 10.

Figure 20:
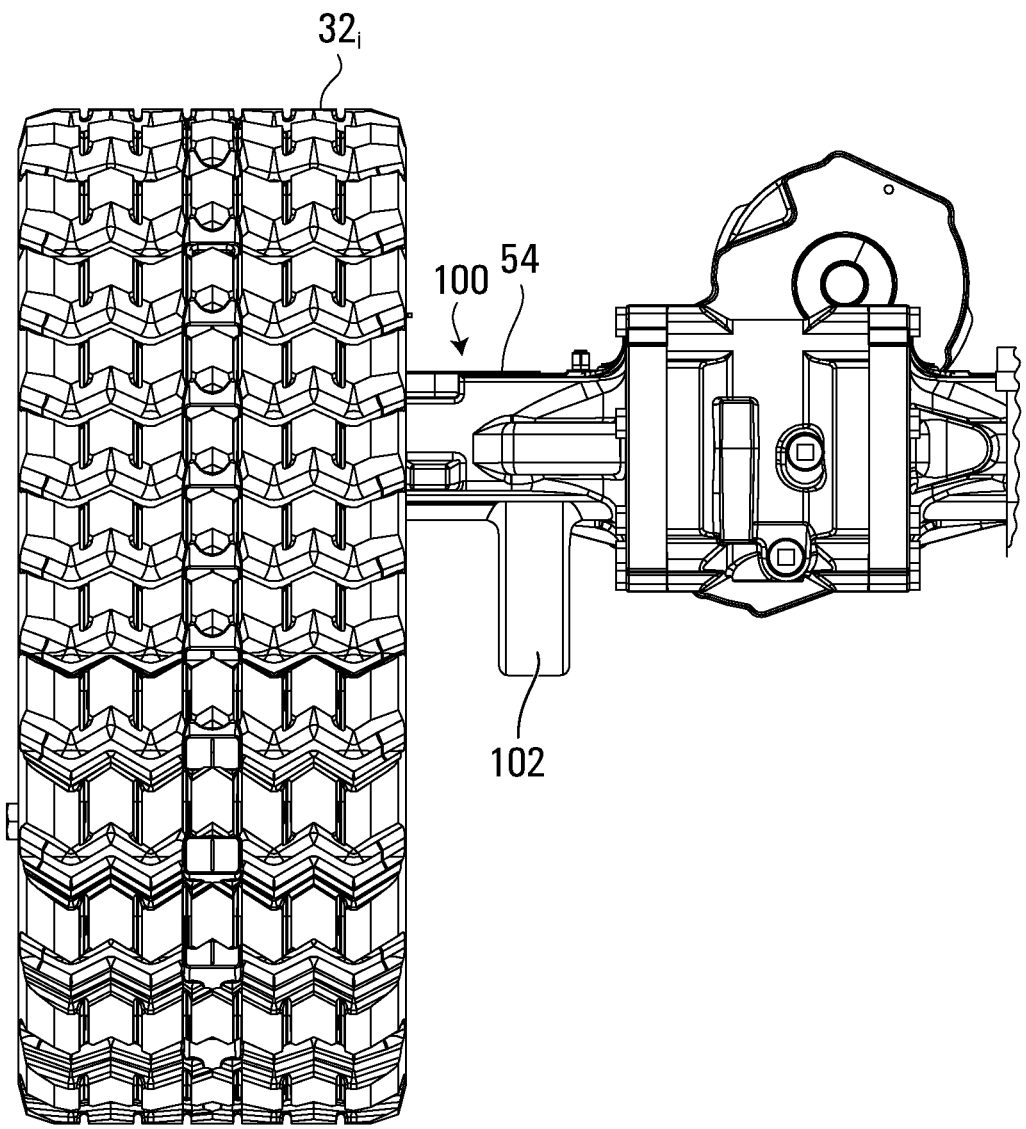
FIG. 20 shows a rear view of the connector when a ground-engaging wheel is mounted to the vehicle in place of the track system.

The connector 102 of the standard component 100 of the vehicle 10 remains in place irrespective of whether or not the track system $16_i$ is connected thereto. In other words, the connector 102 remains when the track system $16_i$ is not mounted to the vehicle 10 and the wheel $32_i$ is mounted in its place, as shown in FIG. 20.

In this embodiment, the standard component 100 of the vehicle 10 is part of the axle assembly $50_i$ of the powertrain 15 of the vehicle 10 to drive the track system $16_i$ such that the axle assembly $50_i$ comprises the connector 102 dedicated to the track system $16_i$. More particularly, in this embodiment, the standard component 100 of the vehicle 10 is the axle housing 54 of the axle assembly $50_i$ that houses the axle 52. In this example, the axle housing 54 extends between a differential 56 of the powertrain 15 and a drive hub 60 of the axle assembly $50_i$ to which the drive wheel 24 of the track system $16_i$ or the ground-engaging wheel $32_i$ is to be connected.

The connector 102 is dedicated to connecting the track system $16_i$ to the vehicle 10. Thus, the connector 102 is unnecessary for a primary function of the standard component 100 of the vehicle 10, i.e., it could be omitted (e.g., removed) and the primary function of the standard component 100 of the vehicle 10 would still be fulfilled. For example, in this embodiment where it is part of the axle housing 54, the connector 102 could be omitted (e.g., removed) from the axle housing 54 and the axle housing 54 would still house the axle 52.

Moreover, the connector 102 is a built-in connector in that it is provided as part of the standard component 100 of the vehicle 10 during original manufacturing of the standard component 100 of the vehicle 10. Therefore, in this embodiment in which the standard component 100 of the vehicle is the axle housing 54, the connector 102 is provided as part of the axle housing 54 during original manufacturing of the axle housing 54. The connector 102 is thus joined to an adjacent part 107 of the axle housing 54 during original manufacturing of the axle housing 54. The adjacent part 107 of the axle housing 54 may be a portion of a body 117 of the axle housing 54 which houses the axle 52.

More particularly, in this embodiment, the connector 102 is integral with the adjacent part 107 of the axle housing 54, i.e., integrally formed with the adjacent part 107 of the axle housing 54 such that the connector 102 and the adjacent part 107 of the axle housing 54 are unitarily formed as a single piece. That is, the connector 102 is manufactured such that material of the connector 102 is continuous and integral with material of the adjacent part 107 of the axle housing 54. For example, in this embodiment, the axle housing 54 is molded in a mold and the connector 102 is formed during molding of the axle housing 54 in the mold. In this case, the axle housing 54 is cast and the connector 102 is formed during casting of the axle housing 54. The connector 102 may thus be formed of metallic material that is continuous and integral with metallic material of the adjacent part 107 of the axle housing 54.

The connector 102 dedicated to connecting the track system $16_i$ may be implemented in any suitable way.

In this embodiment, the connector 102 comprises a bracket 109 to receive part of the track system $16_i$. The connector 102 projects from the adjacent part 107 of the axle housing 54. In this case, the connector 102 depends downwardly from the adjacent part 107 of the axle housing 54.

Figure 13:
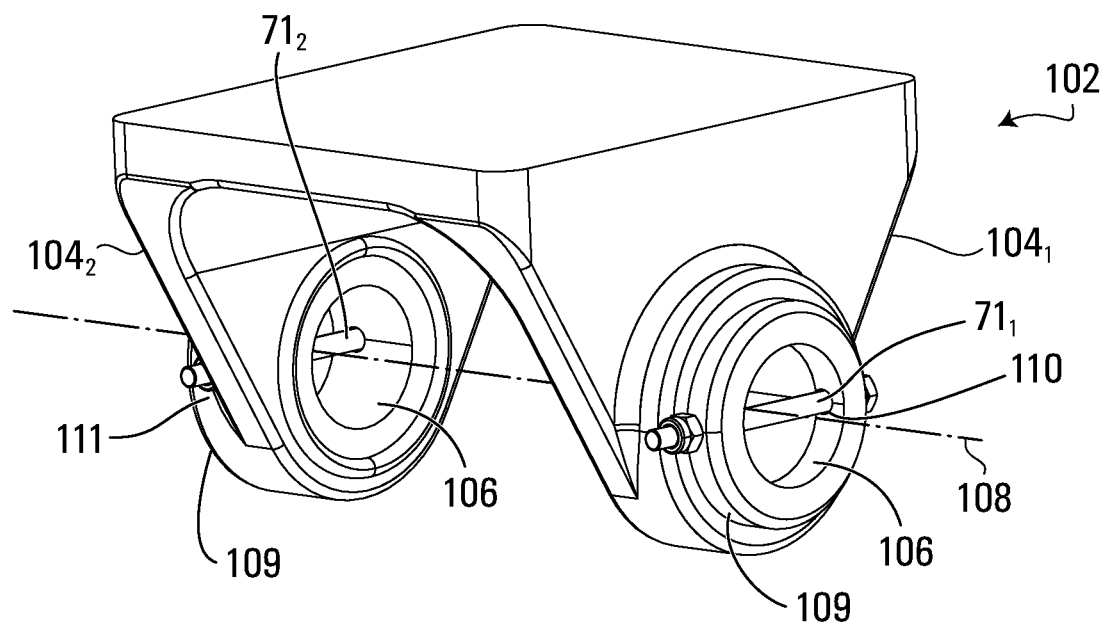
FIGS. 13 and 14 are perspective and front views of the connector of FIG. 11.
Figure 14:
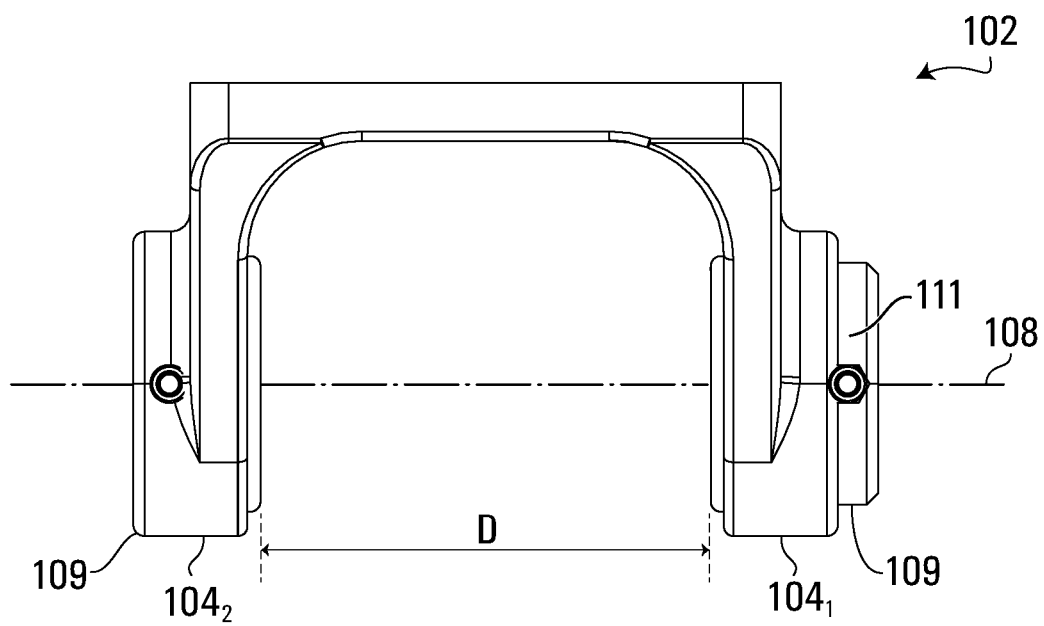

More particularly, with reference to FIGS. 13 and 14, in this embodiment, the connector 102 comprises flanges $104_1$, $104_2$ that project from the adjacent part 107 of the axle housing 54, are generally parallel to one another and are spaced apart by a distance D in a widthwise direction of the vehicle 10, which is parallel to the widthwise direction of the track system $16_i$. More specifically, in this example of implementation, the flanges $104_1$, $104_2$ extend downwardly from an underside 62 of the adjacent part 107 of the axle housing 54. Each flange $104_i$ comprises a shaft-receiving opening 106 that extends through the flange $104_i$ in the widthwise direction of the vehicle 10. The opening 106 of the flange $104_1$ is concentrically aligned with the opening 106 of the flange $104_2$ such that they define a common center axis 108 extending in the widthwise direction of the vehicle 10. The shaft-receiving opening 106 is sized to receive a shaft 105 that, as will be explained in more detail below, secures the track system $16_i$ to the connector 102.

Figure 4:
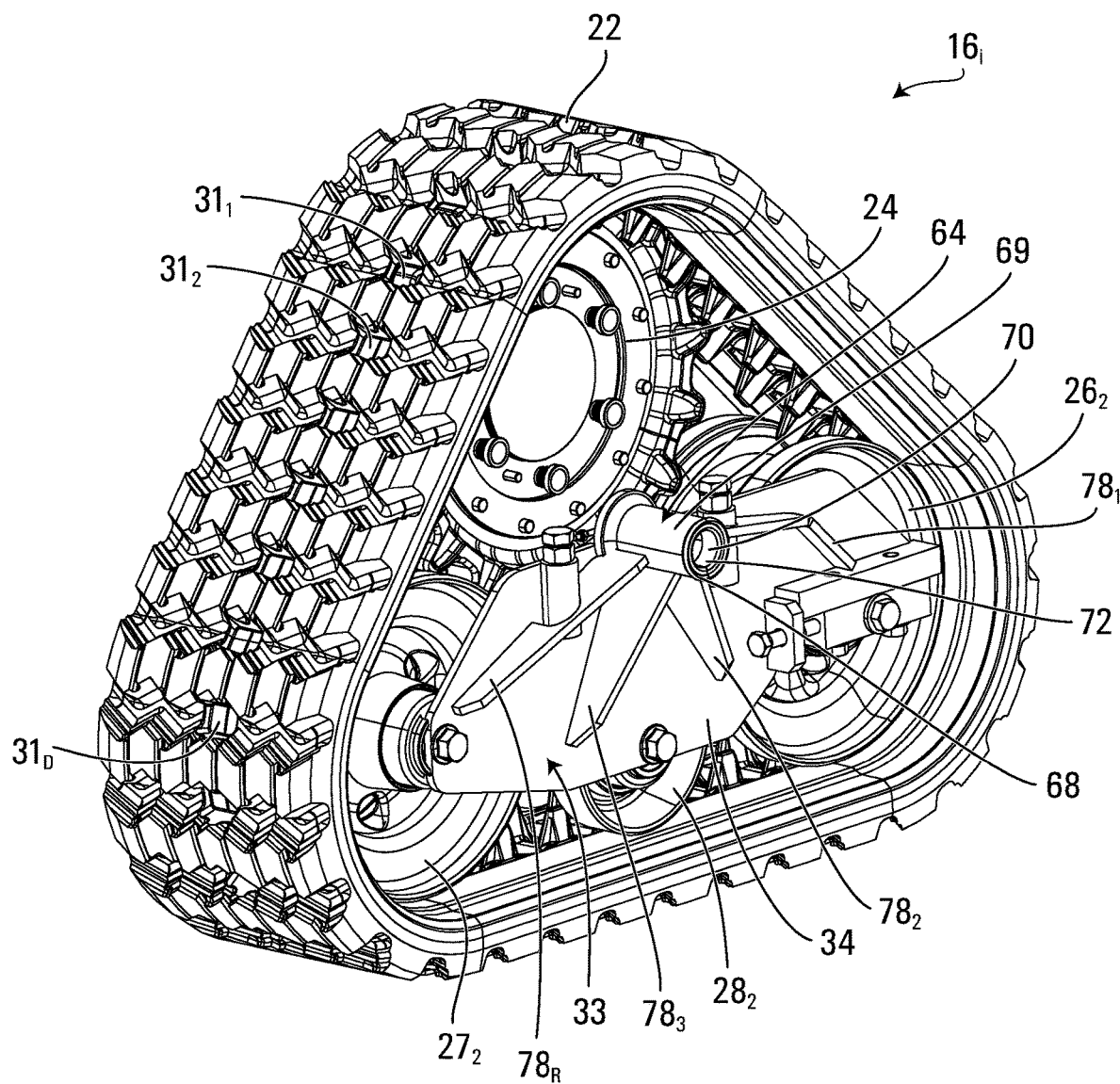
Figure 5:
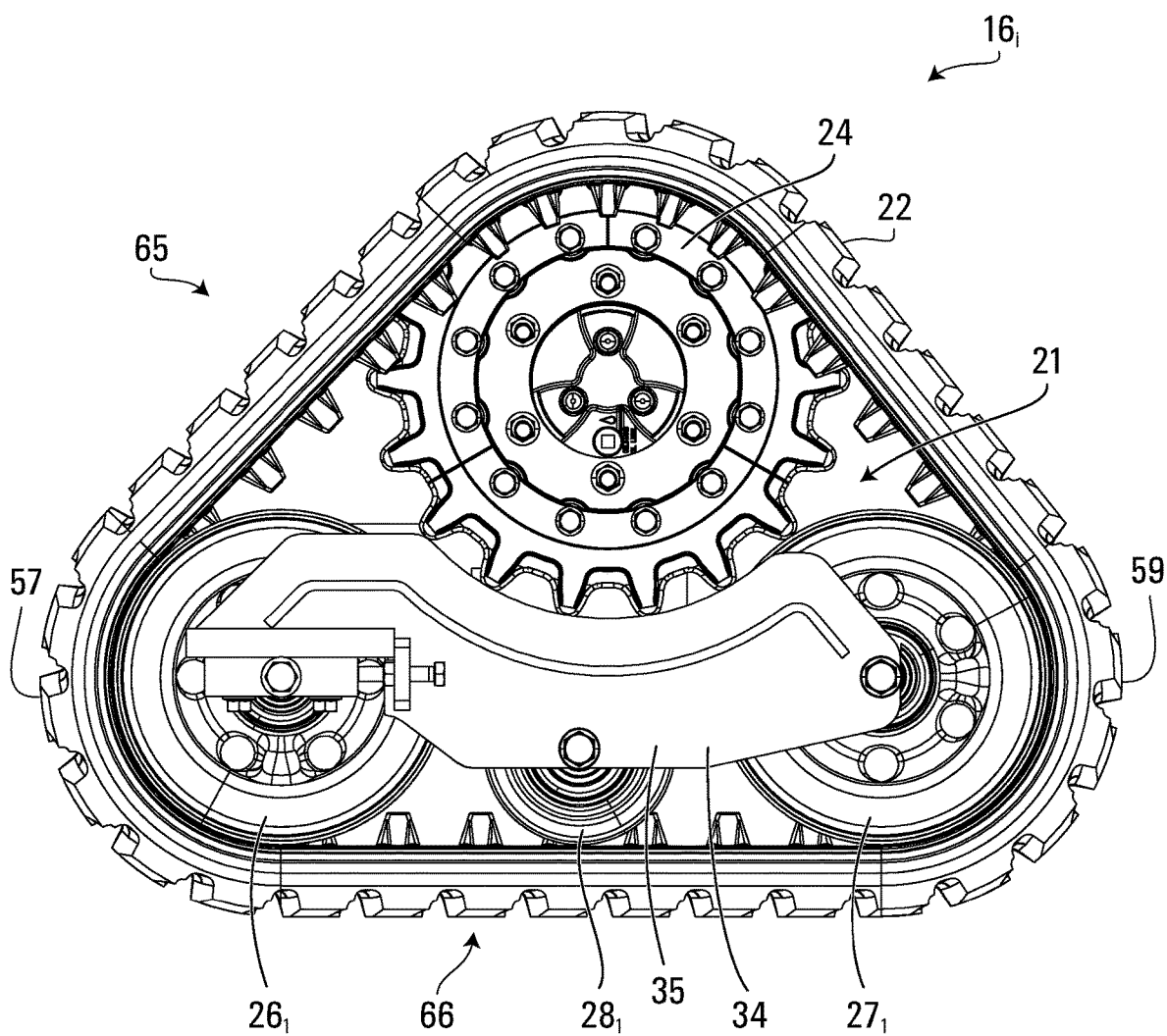
FIGS. 5 and 6 are front and rear elevational views of the track system.
Figure 6:
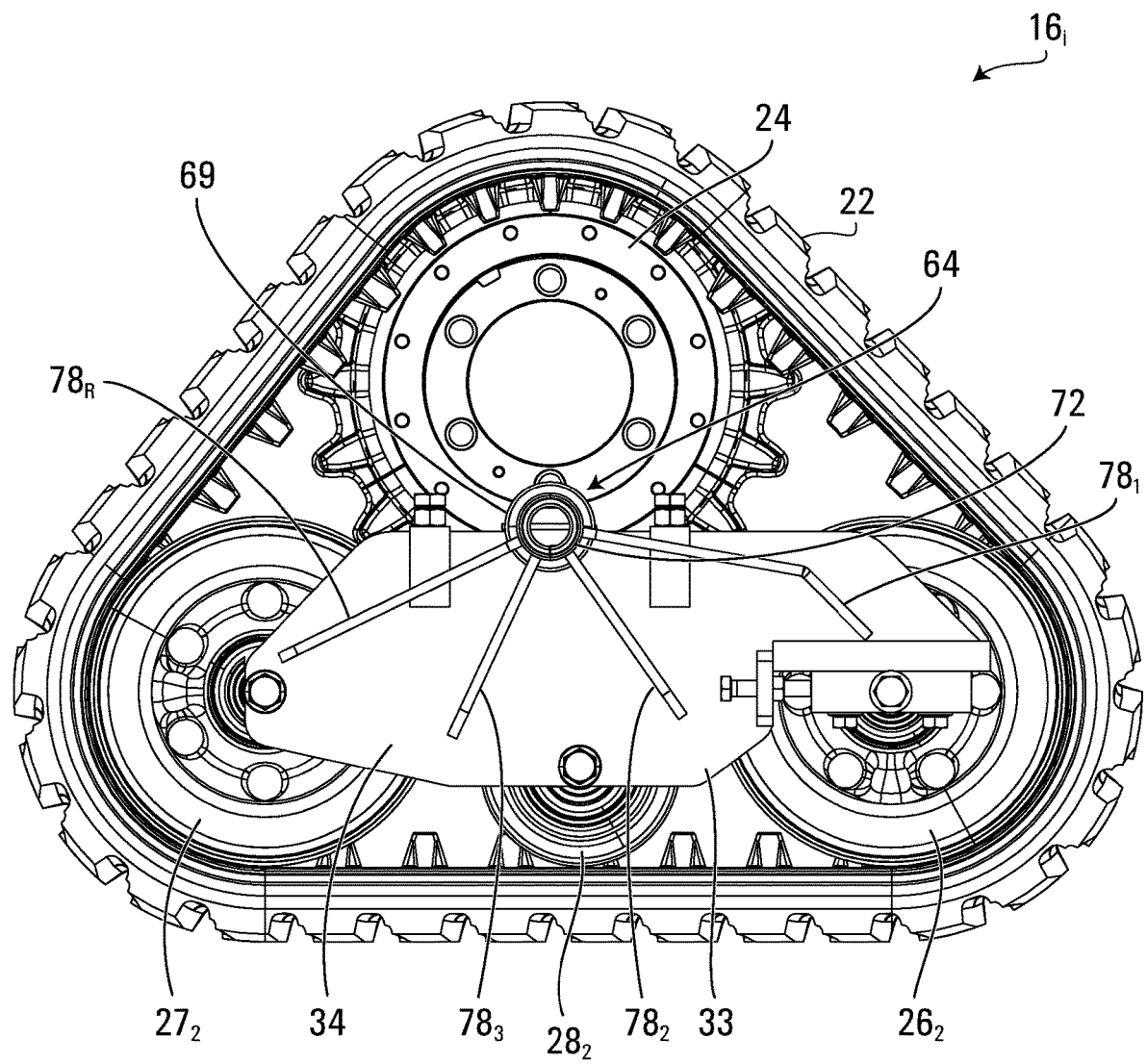
Figure 7:
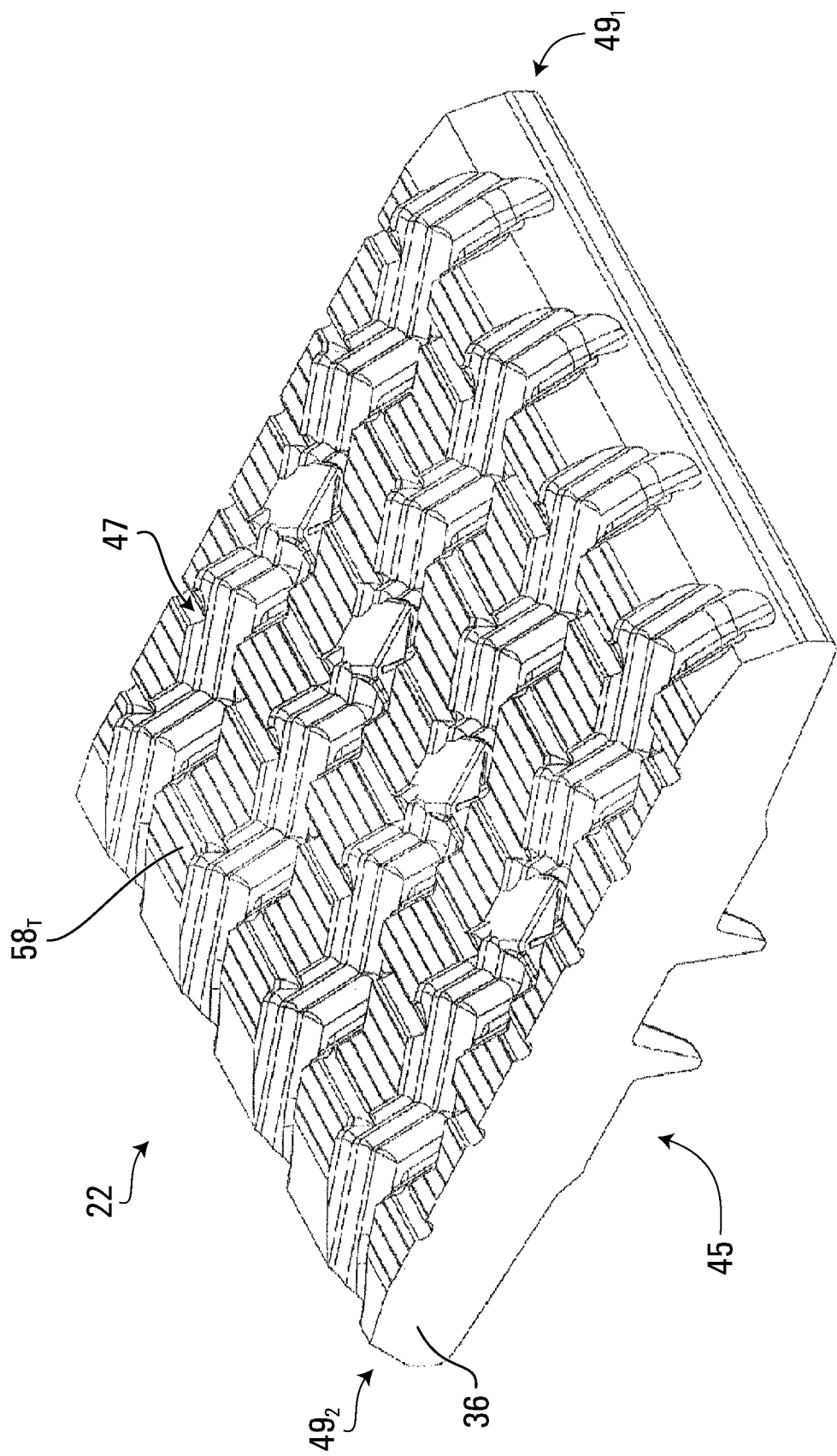
FIGS. 7 to 10 show a track of the track system.
Figure 8:
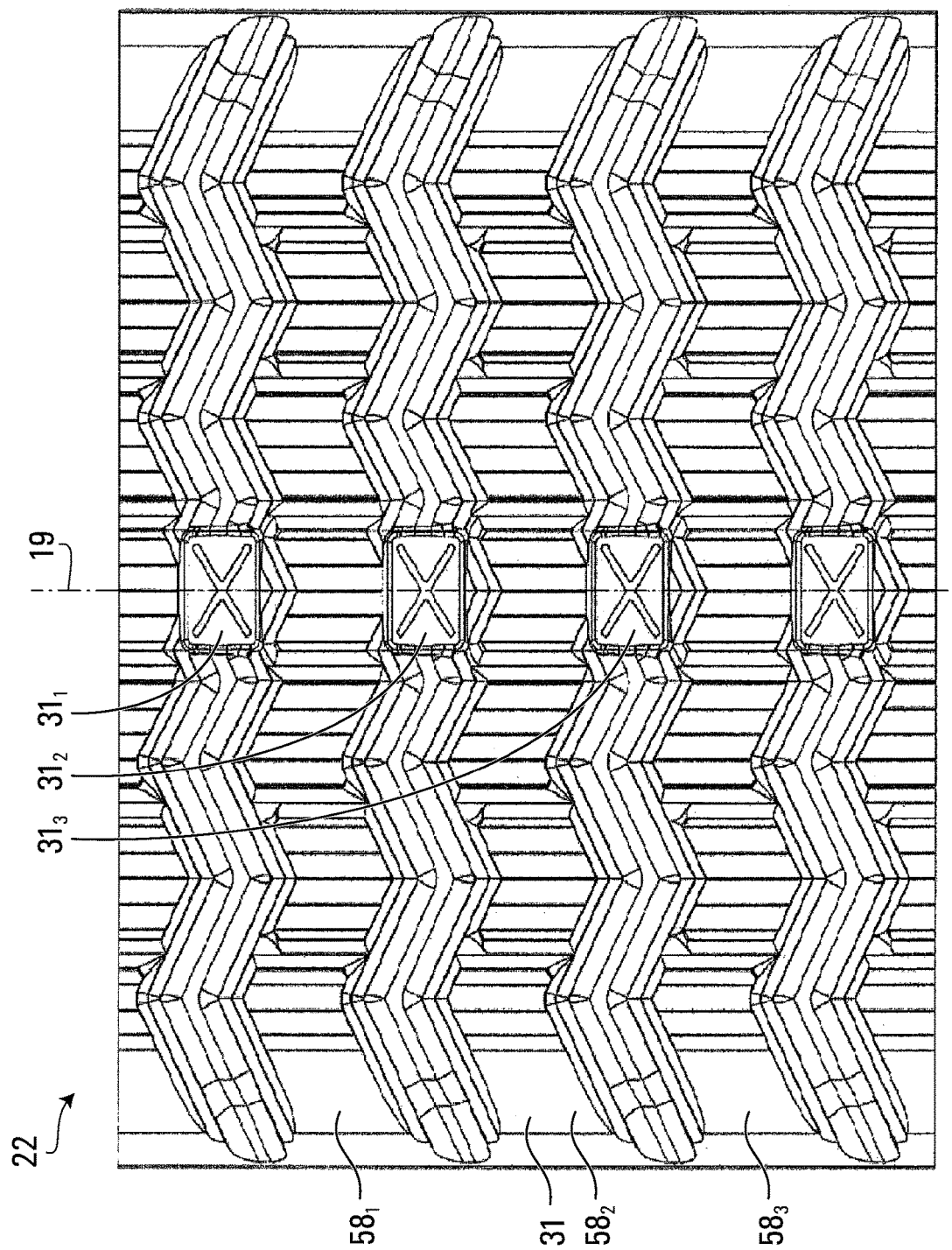
Figure 9:
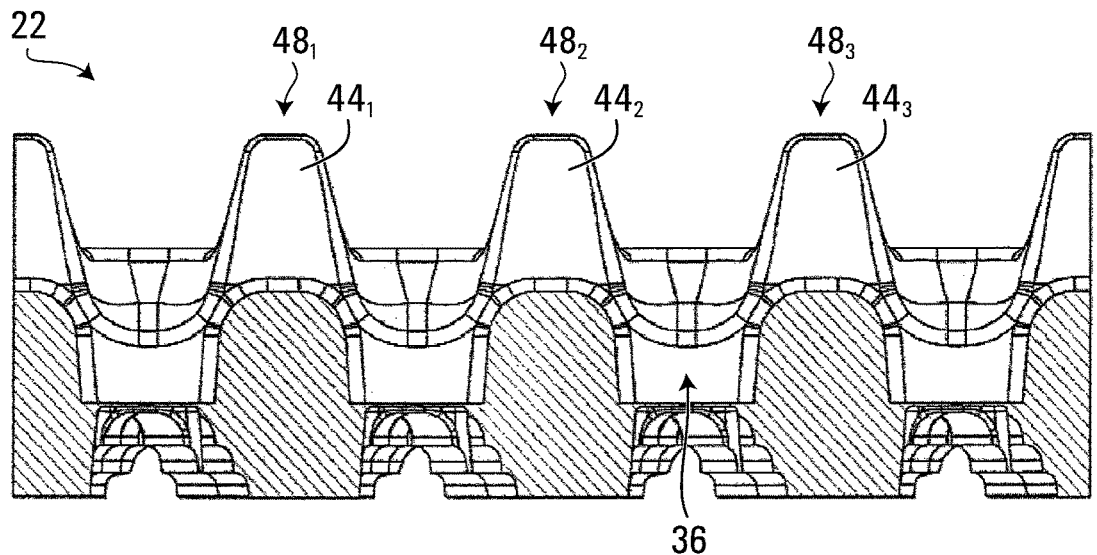
Figure 10:
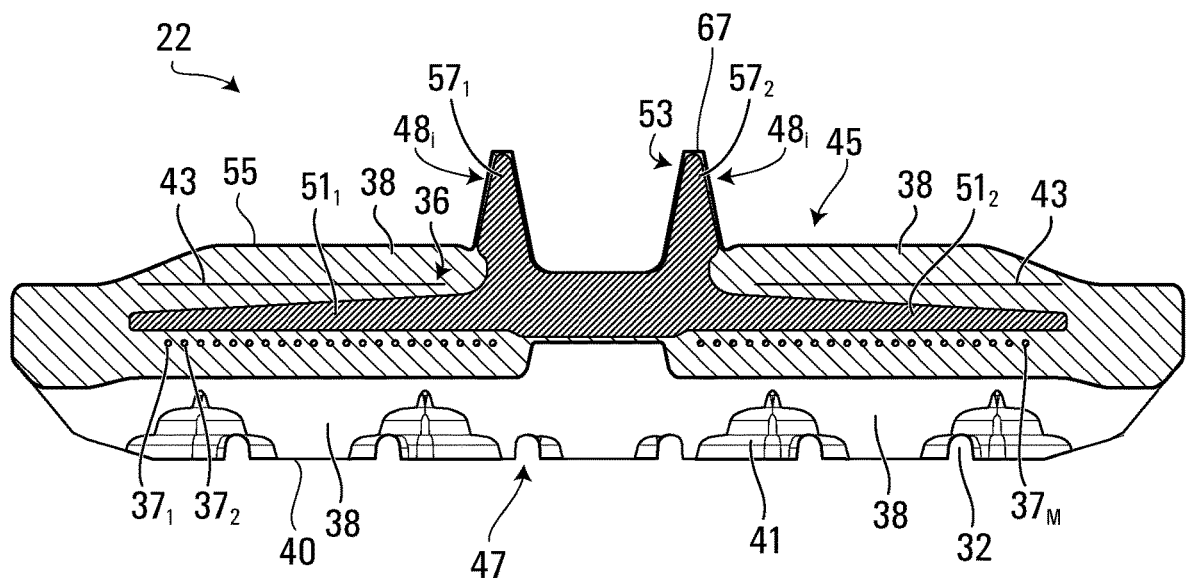

The connector 102 of the axle housing 54 may connect to the track system $16_i$ in any suitable way. In this embodiment, the frame 34 of the track system $16_i$ is configured for being coupled to the connector 102 of the axle housing 54. To that end, in this embodiment, as shown in FIGS. 4 and 6, an inboard side 33 of the frame 34, which is opposite to an outboard side 35 of the frame 34 and configured to face inwardly toward a centerline of the vehicle 10, comprises a connector 64 for connecting to the connector 102 of the axle housing 54. In this embodiment, the connector 64 of the frame 34 of the track system $16_i$ comprises a hub 68 which comprises a tubular body 69 extending in the widthwise direction of the track system $16_i$. The hub 68 has a length, defined between its opposite longitudinal ends, which can be substantially equal to or less than the distance D between the flanges $104_1$, $104_2$ of the connector 102 of the axle housing 54. The hub 68 also comprises at least one bearing 72 defining an opening 70 of the hub 68 which extends along the length of the hub 68 and is configured for receiving the shaft 105 to interconnect the connector 64 of the track system $16_i$ and the connector 102 of the axle housing 54. In some embodiments, the hub 68 may comprise more than one bearing 72, in which case these bearings are concentrically aligned with one another.

In this embodiment, the frame 34 of the track system $16_i$ also comprises a plurality of reinforcing ribs $78_1$-$78_R$ for reinforcing a connection between the hub 68 and a remainder of the frame 34. The reinforcing ribs $78_1$-$78_R$ extend on the inboard side 33 of the frame 34 and are connected (e.g., welded) to an outer surface of the hub 68. The frame 34 of the track system $16_i$ may be configured differently in other embodiments.

Figure 12:
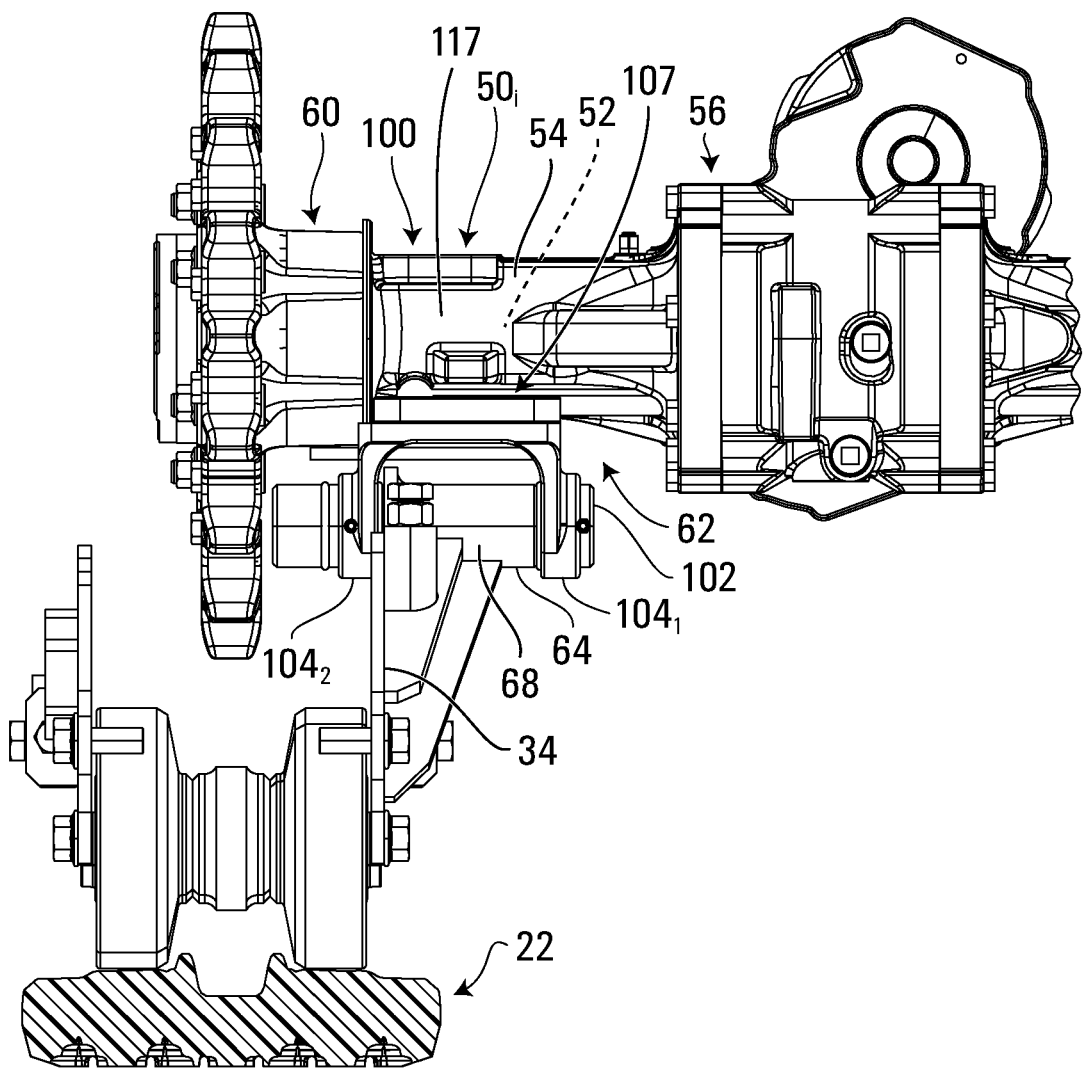
FIG. 12 shows part of the track system connected to the connector of the axle housing.
Figure 15:
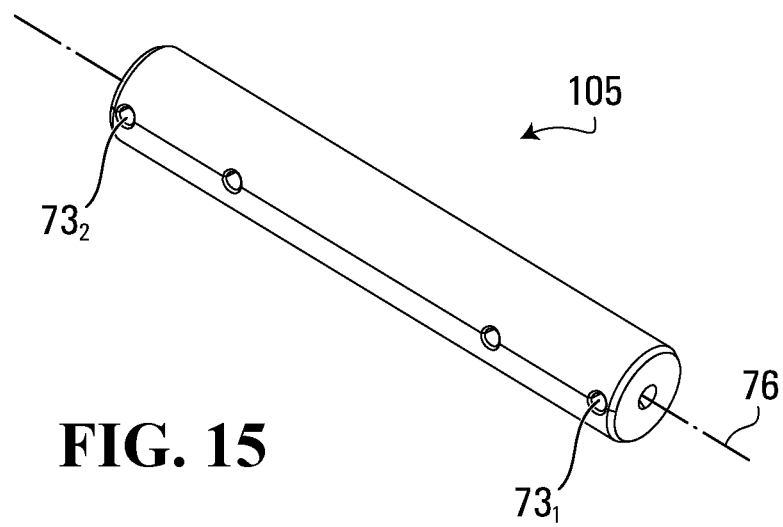
FIG. 15 shows an example of a shaft for interconnecting the connector of the axle housing to a connector of the track system.

Thus, as shown in FIG. 12, in this embodiment, in order to connect the track system $16_i$ to the connector 102 of the axle housing 54, the hub 68 of the connector 64 of the frame 34 of the track system $16_i$ is positioned between the flanges $104_1$, $104_2$ of the connector 102 of the axle housing 54 such that the opening 70 of the hub 68 is aligned with the openings 106 of each of the flanges $104_1$, $104_2$. Then, the shaft 105 is inserted into the openings 106 of the flanges $104_1$, $104_2$ and into the opening 70 of the hub 68 such that an axis 76 along which the shaft 105 extends is aligned with the axis 108 defined by the openings 106 of the flanges $104_1$, $104_2$. In order to fix the shaft 105 in this position, fasteners $71_1$, $71_2$ are provided for engaging the flanges $104_1$, $104_2$ and the shaft 105 such as to secure the shaft 105 to the flanges $104_1$, $104_2$. In this embodiment, each fastener $71_i$ comprises a bolt and a nut. In other embodiments, the fasteners $71_1$, $71_2$ may comprise screws or other threaded fasteners, rivets, cotter pins, or any other suitable fasteners. As shown in FIG. 15, the shaft 105 comprises a plurality of openings $73_1$, $73_2$ extending in a direction transversal to an axis 76 of the shaft 105, and a collar portion 111 of each of the flanges $104_1$, $104_2$ comprises an opening 110 for being aligned with a respective opening $73_i$ of the shaft 105. Each fastener $71_i$ is inserted into the openings $73_i$, 110 such as to secure the shaft 105 to the connector 102.

In this embodiment, since the shaft 105 is mounted to the bearing 72 of the hub 68, the hub 68 is pivotable about the axis 76 of the shaft 105. In other words, the frame 34 of the track system $16_i$ is pivotable about the axis 76 of the shaft 105 which is coincident with the axis 108 defined by the flanges $104_1$, $104_2$ of the connector 102. This may allow the track system $16_i$ to accommodate an uneven ground, such as an uneven terrain and/or an obstacle encountered on the ground.

Figure 16:
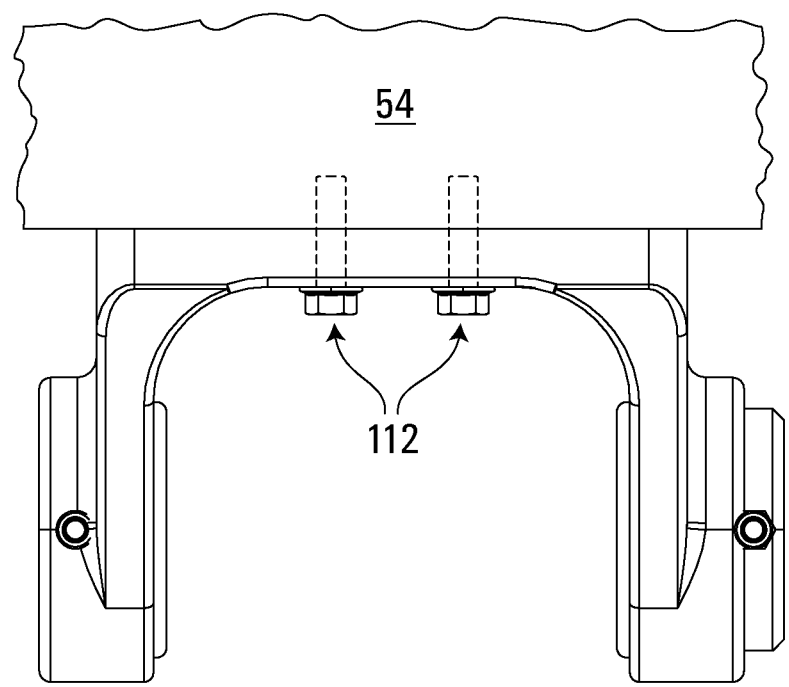
FIG. 16 shows an example of an embodiment in which the connector of the axle housing is formed separately from and fastened to another part of the axle housing.

While in this embodiment the connector 102 of the axle housing 54 is an integral part of the axle housing 54, in other embodiments, the connector 102 may be a separate part of the axle housing 54 that is secured to the adjacent part 107 of the axle housing 54 after manufacturing of the adjacent part 107 of the axle housing 54. In other words, the connector 102 may be formed separately form the adjacent part 107 of the axle housing 54 and affixed thereto subsequently during original manufacturing of the axle housing 54. For example, in some embodiments, as shown in FIG. 16, the connector 102 may be fastened to the axle housing 54 via one or more fasteners 112. As another example, in some embodiments, the connector 102 may be welded to the axle housing 54.

Although in this embodiment it is the axle housing 54, the standard component 100 of the vehicle 10 that comprises the connector 102 dedicated to connecting the track system $16_i$ may be any other suitable standard part of the vehicle 10.

Figure 17:
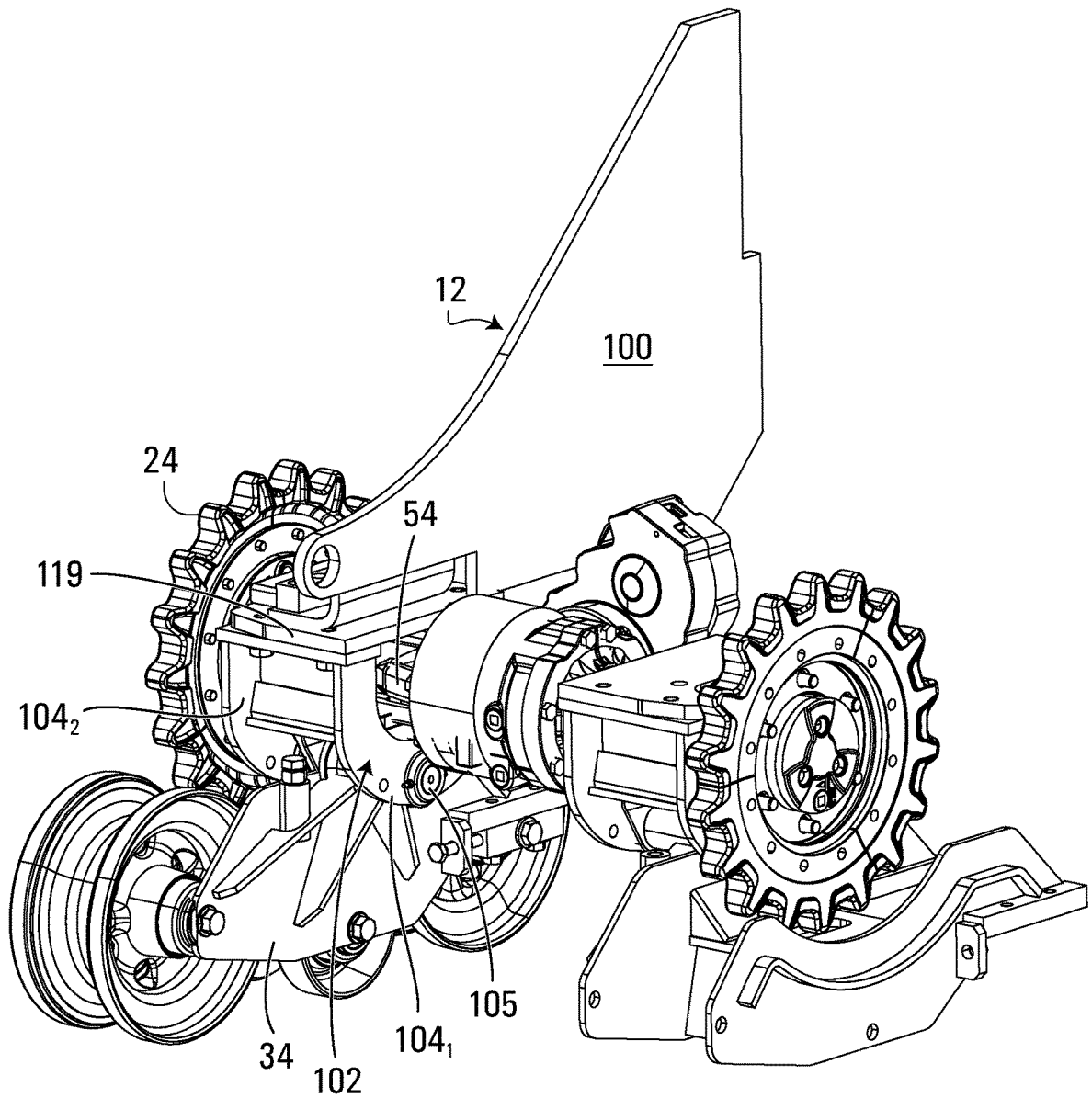
FIG. 17 shows an example of an embodiment in which a frame of the vehicle comprises the connector dedicated to connecting the track system to the vehicle.
Figure 18:
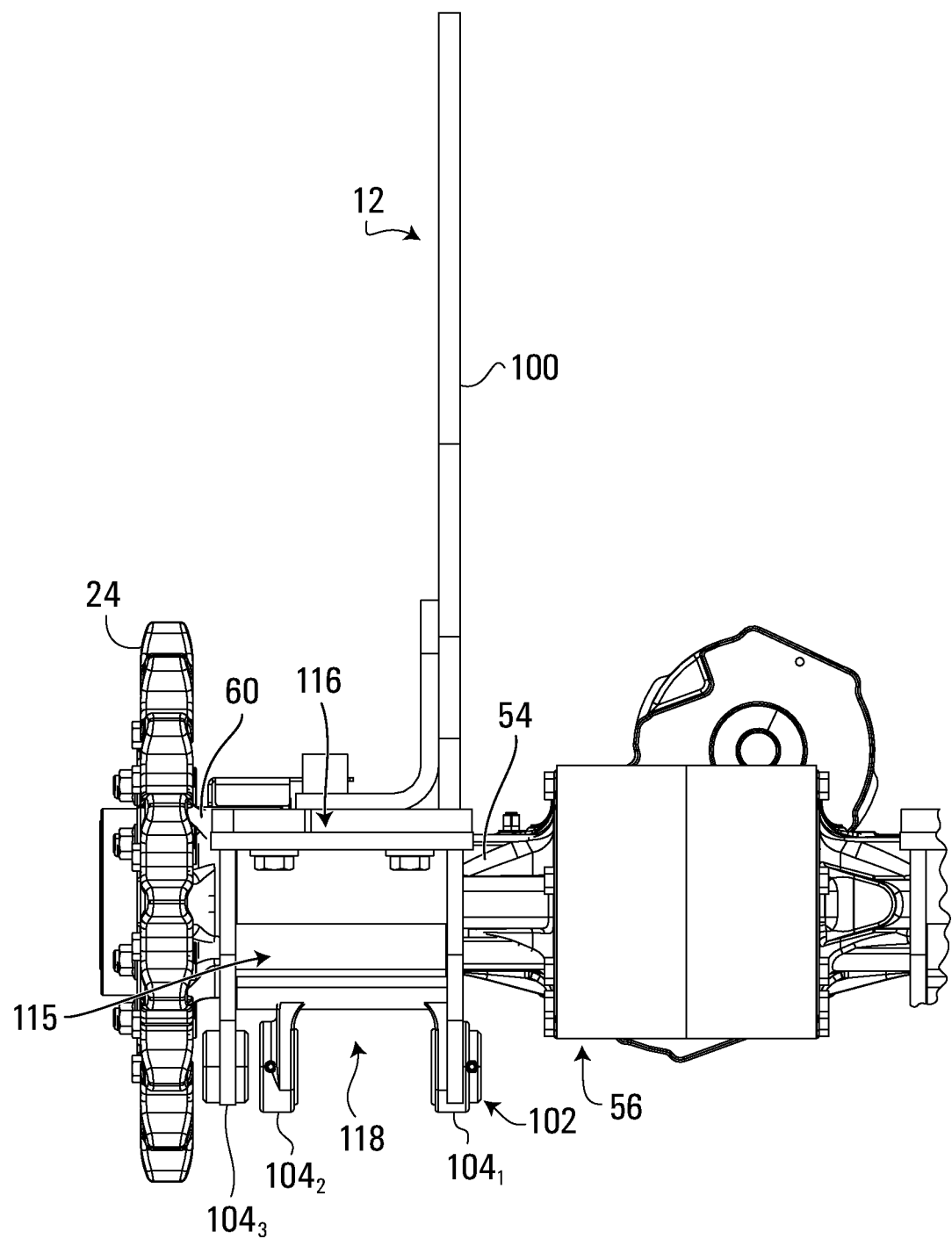
FIG. 18 shows a rear view of the connector of FIG. 17.
Figure 19:
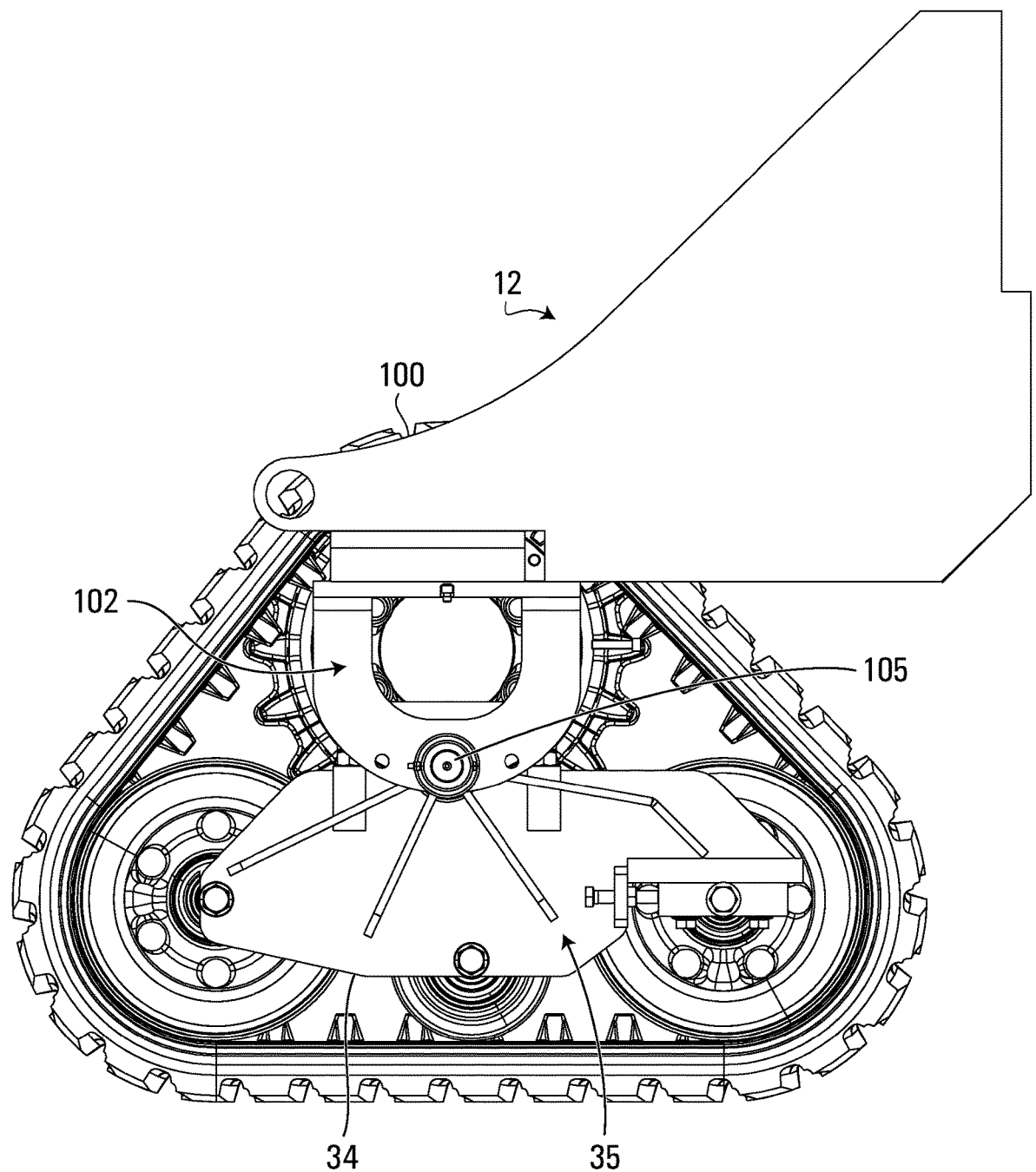
FIG. 19 shows an inner side view of the connector of FIG. 17.

For example, in some embodiments, as shown in FIG. 17, the standard component 100 of the vehicle 10 may be the frame 12 of the vehicle 10 such that the frame 12 comprises the connector 102. That is, in this embodiment, the connector 102 is part of the frame 12 of the vehicle 10. For instance, in this example of implementation, the connector 102 is disposed between the drive hub 60 and the differential 56 of the powertrain 15 in the widthwise direction of the vehicle 10 and comprises a frame member 115 configured to wrap about the axle housing 54. More specifically, the frame member 115 is hollow such as to receive the axle housing 54 therein. The frame member 115 comprises a top side 116 and a bottom side 118 opposite to the top side 116.

The connector 102 comprises the flanges $104_1$, $104_2$ and, in this example, a third flange $104_3$, each of which is located on the bottom side 118 of the frame member 115 and extends downwardly parallel to one another. The flange $104_3$ is configured similarly to the flanges $104_1$, $104_2$ notably comprising the opening 106 which is concentrically aligned with the openings 106 of the flanges $104_1$, $104_2$ and is configured to receive the shaft 105 therein. As such, in this embodiment, the shaft 105 engages the openings 106 of the flanges $104_1$, $104_2$, $104_3$ with the hub 68 being disposed between the flanges $104_1$, $104_2$. The shaft 105 is secured to the flanges $104_1$, $104_2$, $104_3$ in a manner similar to that described above.

In this embodiment, the frame member 115 is connected to an adjacent part 119 of the frame 12 of the vehicle 10 at its top side 116. More specifically, in this example of implementation, the top side 116 of the frame member 115 is fastened to the adjacent part 119 of the frame 12. Fastening of the top side 116 of the frame member 112 to the adjacent part 119 of the frame 12 10 may be done in any suitable way. For instance, in this example, the top side 116 of the frame member 115 is welded to the adjacent part 119 of the frame 12 of the vehicle 10. In other cases, the top side 116 of the frame member 115 may be fastened to the adjacent part 119 of the frame 12 via one or more fasteners (e.g., bolts, screws, rivets, etc.).

While in embodiments considered above the vehicle 10 is a construction vehicle, in other embodiments, the vehicle 10 may be another type of work vehicle such as an agricultural vehicle (e.g., a combine harvester, another type of harvester, a tractor, etc.) for performing agricultural work, a forestry vehicle (e.g., a feller-buncher, a tree chipper, a knuckleboom loader, etc.) for performing forestry work, or a military vehicle (e.g., a combat engineering vehicle (CEV), etc.) for performing military work, or may be a snowmobile, an all-terrain vehicle (ATV), or any other type of vehicle operable off paved roads. Although operable off paved roads, the vehicle 10 may also be operable on paved roads in some cases. Also, while in embodiments considered above the off-road vehicle 10 is driven by a human operator in the vehicle 10, in other embodiments, the vehicle 10 may be an unmanned ground vehicle (e.g., a teleoperated or autonomous unmanned ground vehicle).

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for purposes of description, but should not be limiting. Various modifications and enhancements will become apparent to those of ordinary skill in the art.

The invention claimed is:

1. A vehicle equippable with a plurality of wheels or a plurality of track systems for engaging the ground, wherein a frame of the vehicle comprises a connector dedicated to connecting a given one of the track systems to the vehicle, unnecessary for a primary function of the frame of the vehicle and provided during original manufacturing of the frame of the vehicle, the connector being configured to allow the given one of the track systems to pivot relative to the vehicle.

2. The vehicle of claim 1, wherein the connector is integral with an adjacent part of the frame of the vehicle.

3. The vehicle of claim 2, wherein the connector is molded with the adjacent part of the frame of the vehicle.

4. The vehicle of claim 2, wherein the connector is cast with the adjacent part of the frame of the vehicle.

5. The vehicle of claim 1, wherein the connector is secured to an adjacent part of the frame of the vehicle after manufacturing of the adjacent part of the frame of the vehicle.

6. The vehicle of claim 1, wherein the connector is fastened to an adjacent part of the frame of the vehicle.

7. The vehicle of claim 6, wherein the connector is fastened to the adjacent part of the frame of the vehicle by a plurality of mechanical fasteners.

8. The vehicle of claim 1, wherein the connector is welded to an adjacent part of the frame of the vehicle.

9. The vehicle of claim 1, wherein the connector projects from an adjacent part of the frame of the vehicle.

10. The vehicle of claim 9, wherein the connector depends downwardly from the adjacent part of the frame of the vehicle.

11. The vehicle of claim 1, wherein the connector comprises a bracket.

12. The vehicle of claim 1, wherein the connector comprises a flange.

13. The vehicle of claim 1, wherein the connector comprises a plurality of flanges.

14. The vehicle of claim 1, wherein the connector comprises an opening to receive a shaft interconnecting the connector and the given one of the track systems.

15. The vehicle of claim 1, wherein the vehicle comprises an axle and an axle housing that houses the axle, and the connector is configured to wrap about the axle housing.

16. The vehicle of claim 1, wherein the vehicle is a construction vehicle.

17. A standard nonrotating component of a vehicle, the vehicle being equippable with a plurality of wheels or a plurality of track systems for engaging the ground and comprising an axle and an axle housing that houses the axle, the standard nonrotating component of the vehicle comprising a connector dedicated to connecting a given one of the track systems to the vehicle, unnecessary for a primary function of the standard nonrotating component of the vehicle and provided during original manufacturing of the standard nonrotating component of the vehicle, wherein the connector is configured to wrap about the axle housing.

18. The standard nonrotating component of the vehicle of claim 17, wherein the standard nonrotating component of the vehicle is part of an axle assembly of the vehicle, the axle assembly comprising the axle and the axle housing.

19. The standard nonrotating component of the vehicle of claim 17, wherein the connector is molded with the adjacent part of the standard nonrotating component of the vehicle.

20. The standard nonrotating component of the vehicle of claim 17, wherein the connector is cast with the adjacent part of the standard nonrotating component of the vehicle.

21. The standard nonrotating component of the vehicle of claim 17, wherein the connector projects from an adjacent part of the standard nonrotating component of the vehicle.

22. The standard nonrotating component of the vehicle of claim 21, wherein the connector depends downwardly from the adjacent part of the standard nonrotating component of the vehicle.

23. The standard nonrotating component of the vehicle of claim 17, wherein the connector comprises a bracket.

24. The standard nonrotating component of the vehicle of claim 17, wherein the connector comprises a flange.

25. The standard nonrotating component of the vehicle of claim 17, wherein the connector comprises a plurality of flanges.

26. The standard nonrotating component of the vehicle of claim 17, wherein the connector comprises an opening to receive a shaft interconnecting the connector and the given one of the track systems.

27. The standard nonrotating component of the vehicle of claim 17, wherein the connector is integral with an adjacent part of the standard nonrotating component of the vehicle.

28. The standard nonrotating component of the vehicle of claim 17, wherein the connector is configured to allow the given one of the track systems to pivot relative to the vehicle.

29. The standard nonrotating component of the vehicle of claim 17, wherein the vehicle is a construction vehicle.

30. An axle housing for housing an axle of a vehicle, the vehicle being equippable with a plurality of track systems for engaging the ground, the axle housing comprising a connector dedicated to connecting a given one of the track systems to the vehicle and provided during original manufacturing of the axle housing, wherein the connector is configured to allow the given one of the track systems to pivot relative to the vehicle.

31. The axle housing of claim 30, wherein the connector projects from an adjacent part of the axle housing.

32. The axle housing of claim 31, wherein the connector depends downwardly from the adjacent part of the axle housing.

33. The axle housing of claim 30, wherein the connector comprises a bracket.

34. The axle housing of claim 30, wherein the connector comprises a flange.

35. The axle housing of claim 30, wherein the connector comprises a plurality of flanges.

36. The axle housing of claim 30, wherein the connector comprises an opening to receive a shaft interconnecting the connector and the given one of the track systems.

37. The axle housing of claim 30, wherein the connector is integral with an adjacent part of the axle housing.

38. The axle housing of claim 37, wherein the connector is molded with the adjacent part of the axle housing.

39. The axle housing of claim 37, wherein the connector is cast with the adjacent part of the axle housing.

40. The axle housing of claim 30, wherein the vehicle is a construction vehicle.

41. A standard nonrotating component of a vehicle, the vehicle being equippable with a plurality of wheels or a plurality of track systems for engaging the ground, the standard nonrotating component of the vehicle comprising a connector dedicated to connecting a given one of the track systems to the vehicle, unnecessary for a primary function of the standard nonrotating component of the vehicle and provided during original manufacturing of the standard nonrotating component of the vehicle, wherein the connector is configured to allow the given one of the track systems to pivot relative to the vehicle.

42. The standard nonrotating component of the vehicle of claim 41, wherein the standard nonrotating component of the vehicle is part of an axle assembly of the vehicle.

43. The standard nonrotating component of the vehicle of claim 42, wherein the axle assembly of the vehicle comprises an axle and an axle housing that houses the axle and the standard nonrotating component of the vehicle is the axle housing of the vehicle.

44. The standard nonrotating component of the vehicle of claim 41, wherein the standard nonrotating component of the vehicle is a frame of the vehicle.

45. The standard nonrotating component of the vehicle of claim 41, wherein the connector comprises a bracket.

46. The standard nonrotating component of the vehicle of claim 41, wherein the connector comprises a flange.

47. The standard nonrotating component of the vehicle of claim 41, wherein the connector comprises a plurality of flanges.

48. The standard nonrotating component of the vehicle of claim 41, wherein the connector comprises an opening to receive a shaft interconnecting the connector and the given one of the track systems.

49. The standard nonrotating component of the vehicle of claim 41, wherein the vehicle comprises an axle and an axle housing that houses the axle, and the connector is configured to wrap about the axle housing.

50. The standard nonrotating component of the vehicle of claim 41, wherein the connector is welded to an adjacent part of the standard nonrotating component of the vehicle.

51. The standard nonrotating component of the vehicle of claim 41, wherein the vehicle is a construction vehicle.

52. The standard nonrotating component of the vehicle of claim 50, wherein the connector is welded to the adjacent part of the standard nonrotating component of the vehicle after manufacturing of the adjacent part of the standard nonrotating component of the vehicle.

53. The standard nonrotating component of the vehicle of claim 50, wherein the connector projects from the adjacent part of the standard nonrotating component of the vehicle.

54. The standard nonrotating component of the vehicle of claim 53, wherein the connector depends downwardly from the adjacent part of the standard nonrotating component of the vehicle.

* * * * *